Jan. 14, 1941.  E. L. RIETZ  2,228,488

RIM MOUNTING

Filed Sept. 30, 1938

Inventor
Edward L. Rietz
By
Atty.

Patented Jan. 14, 1941

2,228,488

UNITED STATES PATENT OFFICE 2,228,488

RIM MOUNTING

Edward L. Rietz, Riverside, Ill., assignor to International Harvester Company, a corporation of New Jersey Application September 30, 1938, Serial No. 232,621

7 Claims. (Cl. 301—11)

This invention relates to tire and rim mountings for wheels and more particularly to tire and rim mountings for the closely spaced wheels of the front truck structure of a row-crop vehicle.

A row-crop vehicle is a tractor generally comprising a narrow longitudinal body portion supported at its rear end on comparatively large drive wheels and at its front end on a steerable front truck structure in which a pair of wheels are coaxially disposed in closely spaced relation. This structure is common to tractors of the row-crop or tricycle type and the advantages in such constructions are well known to those skilled in the art. The stub axles, upon which the front wheels are mounted, are respectively inclined from the horizontal so that the planes of the wheels converge toward the ground, thus enabling the tractor to follow certain ground contours and to facilitate steering. It is found in numerous instances that the front wheels of the tractor are too closely spaced to enable easy operation of the tractor over listed fields; that is, when the tractor is operating along the longitudinal listed ridges, in which case the closely spaced front wheels do not maintain a position centrally along the peak of the ridge, but often veer to one side or the other.

The principal object contemplated by the invention, therefore, is the provision of a tire and rim mounting which is reversible on the wheels of the front truck to reverse the positions of the tires with respect to the wheels to provide a narrow-tread front truck for desired purposes and a wider tread front truck for other desired purposes.

Another object is to provide a tire and rim mounting which comprises a plurality of rim-supporting members or lugs capable of interchangeability with each other and from wheel to wheel.

Another object is to provide a tire and rim mounting in which an ordinary or standard rim may be used.

And, another object is to provide these lugs in a simple and inexpensive form, the lugs being easily and readily changed from one position to another.

Briefly and specifically, these and other desirable objects are achieved in one preferred form of the invention by a provision of a plurality of pairs of lugs, in which each lug of a pair has an off-set rim-engaging portion, which in one position serves to mount the tire and rim axially off-set at one side of the plane of the wheel, and in reverse position serves to mount the rim axially off-set at the other side of the wheel.

A more complete understanding of the objects and important features of the invention may be had from the following detailed description taken in conjunction with the accompanying sheet of drawings, in which.

Figure 3:
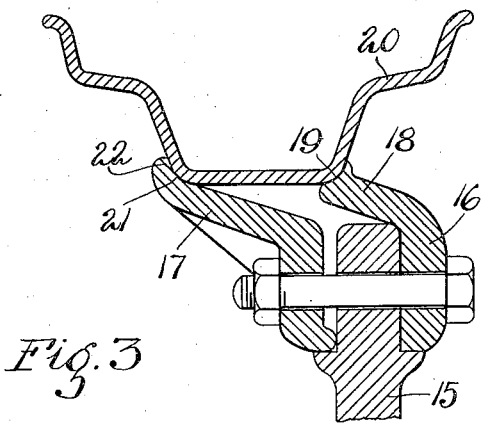
Figure 3 is an enlarged sectional view showing a portion of a wheel with the lugs serving to mount the rim in one position; and, Figure 4 is a similar sectional view showing the lugs reversed and supporting the rim in the other position.

The vehicle shown for the purposes of illustration is a tractor of the tricycle or row-crop type comprising a narrow longitudinal body, only the front portion of which is shown, at 10. This forward portion is supported on a steerable front truck 11 which comprises a vertical support or standard 12 connected by suitable steering mechanism, not shown, to the customary steering wheel, also not shown. The lower portion of the standard carries a suitable axle structure 13 comprising a pair of outwardly extending stub axles 14, each of which is inclined downwardly from the horizontal. Each axle 14 has rotatably carried thereon a wheel 15, which, because of the inclination of the axle, is disposed in a plane slightly inclined from the vertical whereby the planes of the two wheels converge toward the ground. Each wheel 15 includes a suitable hub 15' for mounting the wheel on the axle 14.

As best shown in Figure 3, the tire and rim mounting means comprise a plurality of pairs of rim-supporting members or lugs 16 and 17 secured respectively to the outer and inner sides of the outer peripheral portion of the wheel 15. The lug 16 includes an axially off-set portion 18 which extends from the outer side of the wheel inwardly to a point substantially in alinement with the inner face of the peripheral portion of the wheel, said peripheral portion being of substantially uniform thickness. It will be understood, of course, that a spoke type wheel may be utilized to similar advantage. The axially off-set portion 18 serves as a rim-engaging or supporting portion and is provided with an inner groove 19 which engages an outer edge of the drop-center portion of a tire-carrying rim 20.

Figure 1:
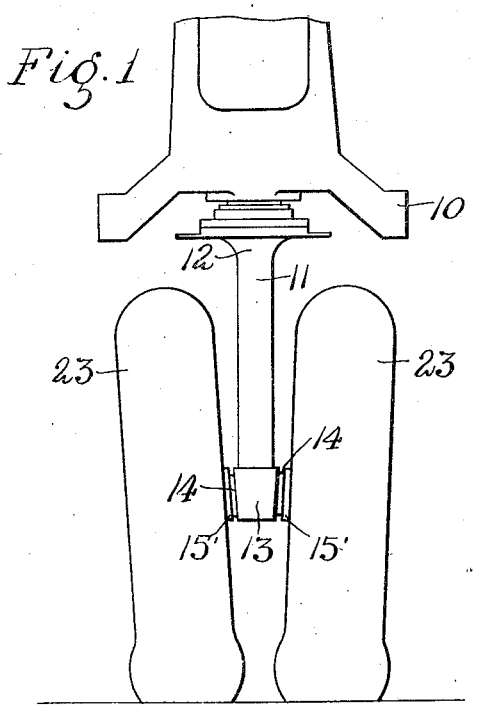
Figures 1 and 2 are front elevational views of the forward portion of a row-crop tractor showing the steerable front truck with the front wheels in narrow-tread and wide-tread relation, respectively.

The other lug 17 is formed with an axially inwardly extending rim-engaging or supporting portion 21 which is curved upwardly at its inner end, as at 22, to support or engage the inner edge of the drop-center portion of the tire-carrying rim 20. As will be seen from this figure, the rim 20 is axially inwardly off-set with respect to the plane of the wheel. Each rim 20 carries a pneumatic tire 23, which tires, as best shown in Figure 1, are disposed in closely spaced relation. With the wheels in this position, the tractor may be operated under customary conditions wherein the narrow-tread front truck is satisfactory. The illustration in Figure 3 corresponds to the right hand tire 23 in Figure 1, as viewed from the front.

Figure 4:
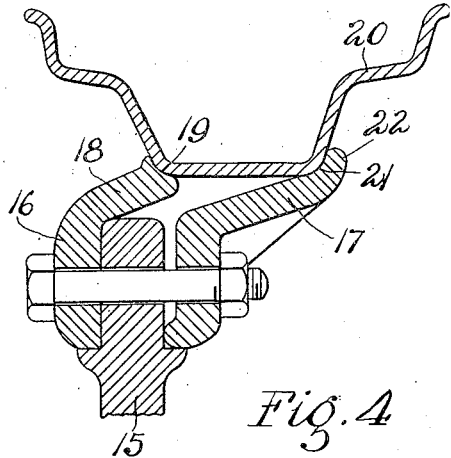
Figure 2:
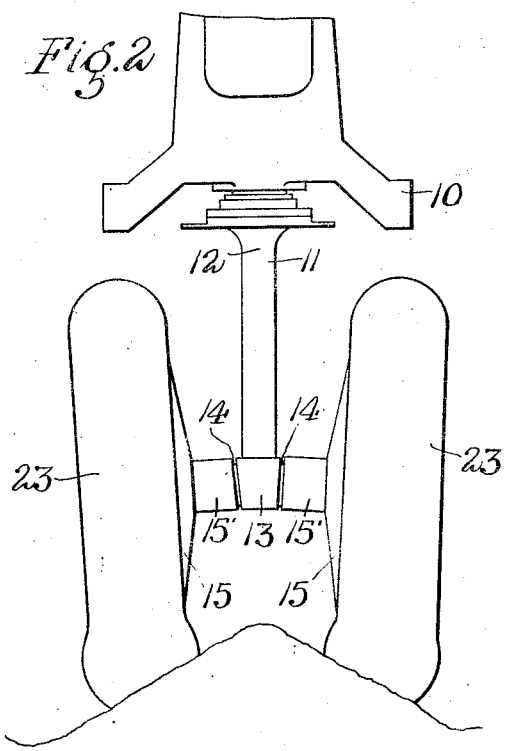

Figure 4 shows the relation between the rim 20 and the wheel 15 when the lugs are reversed on the wheel, in which instance the tire and rim are axially off-set outwardly with respect to the plane of the wheel, the reverse position corresponding to the showing in Figure 2. In the latter figure, the now more widely spaced wheels are shown in operating position with respect to a listed ridge in which case the wheels respectively ride the inclined sides of the ridge, thus straddling the peak of the ridge. With the wheels in this position, the tractor is better enabled to follow the ridge, steering is facilitated, and veering to the right or left is eliminated.

The invention further contemplates the use of the lugs described herein as interchangeable with ordinary lugs that serve to support the tire and rim, centrally of the wheel, the interchangeability permitting three positions of each tire and rim with respect to each wheel.

From the foregoing description, it will be seen that a desirable means has been provided for adapting the steerable front truck structure of a row-crop tractor to different field conditions. It will be understood, of course, that different types of tires or rims and even ordinary steel rims may be employed in place of the tires and rims shown, and also that numerous other alterations and modifications may be made in the structure without departing from the spirit and scope of the appended claims.

What is claimed is:

1. In a narrow-tread front truck structure for a row-crop vehicle in which a pair of wheels are coaxially disposed in closely spaced relation, the combination with the wheels of a pair of tire and rim-carrying means adapted to mount tires and rims respectively on the wheels, each means comprising a plurality of pairs of lugs secured at spaced points about the wheel at its periphery, each lug having wheel-engaging portion and a rim-supporting portion axially off-set with respect to the wheel-engaging portion, the rim-supporting portion of one lug cooperating with the off-set rim-supporting portion of a corresponding lug of a pair for mounting the rim and tire in a position off-set axially at one side with respect to the plane of the wheel, the lugs on each wheel being reversible to off-set each tire and rim at the other side of the wheel, the wheels being thereby more widely spaced to ride the inclined sides of a listed ridge.

2. In a narrow-tread front truck structure for a row-crop vehicle in which a pair of wheels are coaxially disposed in closely spaced relation, the combination with the wheels of a pair of tire and rim-carrying means adapted to mount tires and rims respectively on the wheels, each means comprising a plurality of pairs of lugs secured at spaced points about the wheel at its periphery, one lug in each pair having a wheel-engaging portion secured to one side of the wheel and having a rim-engaging portion axially off-set with respect to the wheel-engaging portion and extending over and beyond the periphery of the wheel, the other lug of said pair having a wheel-engaging portion secured to the other side of the wheel and having a cooperating rim-engaging portion axially off-set with respect to the wheel-engaging portion in the same direction as the other lug, the tire and rim being mounted in a position off-set axially at one side with respect to the plane of the wheel, the lugs on each wheel being reversible to off-set each tire and rim at the other side of the wheel, the wheels being thereby more widely spaced to ride the inclined sides of a listed ridge.

3. In a narrow-tread front truck structure for a row-crop vehicle in which a pair of wheels are coaxially disposed in closely spaced relation, each wheel having a peripheral portion of a substantially uniform thickness, the combination with the wheels of means for mounting a tire and rim respectively on the wheels in a position axially off-set from the plane of the wheel, said means comprising a plurality of pairs of lugs, one lug in each pair including a wheel engaging portion adapted to be secured at one side of the peripheral portion and a rim-engaging portion extending axially therefrom to a point substantially in alignment with the other side of the peripheral portion, the other lug in each pair including a wheel engaging portion adapted to be secured at the other side of the peripheral portion and a rim-engaging portion extending axially therefrom to a point axially spaced from the rim-engaging portion of the first lug, the rim being carried between said portions in the aforesaid off-set position, and a securing means for securing the lugs to the wheel, the lugs on each wheel being reversible to off-set each tire and rim at the opposite side of the wheel, the wheels being thereby more widely spaced to ride the inclined sides of a listed ridge.

4. In a narrow-tread front truck structure for a row-crop vehicle in which a pair of wheels are coaxially disposed in closely spaced relation, the combination with the wheels of a tire and rim-mounting means respectively for each wheel, said means comprising a plurality of lugs secured to the wheel at spaced points about its periphery for supporting the tire-carrying rim, each lug including a wheel-engaging portion and a rim-engaging portion axially off-set from the first portion, said rim-engaging portion extending over and beyond the periphery of the wheel to off-set the tire and rim axially inwardly with respect to the plane of the periphery of the wheel, said lugs being reversible on the wheel to off-set the tire axially outwardly of the plane of the periphery of the wheel, the wheels being thereby more widely spaced to ride the inclined sides of a listed ridge.

5. In a narrow-tread front truck structure for a row-crop vehicle in which a pair of wheels are coaxially disposed in closely spaced relation, the combination with the wheels of a tire and rim-mounting means respectively for each wheel, said means comprising a plurality of lugs secured to the wheel at spaced points about its periphery for supporting the tire-carrying rim, each lug including a wheel-engaging portion and a rim-engaging portion axially off-set from the first portion and extending beyond the periphery of the wheel to off-set the tire and rim axially inwardly with respect to the plane of the periphery of the wheel, said lugs being reversible on the wheel to off-set the tire axially outwardly of the plane of the periphery of the wheel, the wheels being thereby more widely spaced to ride the inclined sides of a listed ridge.

6. In a narrow-tread front truck structure for a row-crop vehicle in which a pair of wheels are coaxially disposed in closely spaced relation, the combination with the wheels of a tire and rim mounting for each wheel comprising means having a portion secured to the periphery of the wheel and having a rim-engaging portion axially off-set with respect to the first portion and extending axially inwardly beyond the plane of the periphery of the wheel to off-set the tire and rim axially inwardly with respect to the wheel, each means being reversible to off-set each tire and rim axially outwardly of the respective wheel, the wheels being thereby more widely spaced to ride the inclined sides of a listed ridge.

7. In a narrow-tread front truck structure for a row-crop vehicle in which a pair of wheels are coaxially disposed in closely spaced relation, the combination with the wheels of a pair of rim-carrying means adapted to mount rims respectively on the wheels, each means comprising a plurality of pairs of lugs secured at spaced points about the wheel at its periphery, each lug having a wheel-engaging portion and a rim-supporting portion axially off-set with respect to the wheel-engaging portion and cooperating with the off-set portion of a corresponding lug for mounting the rim in a position off-set axially at one side with respect to the plane of the wheel, the lugs on each wheel being reversible to off-set each rim at the other side of the respective wheel, the wheels being thereby more widely spaced to ride the inclined sides of a listed ridge.

EDWARD L. RIETZ.